United States Patent
Nakhjavani et al.

(10) Patent No.: US 9,524,301 B2
(45) Date of Patent: Dec. 20, 2016

(54) TRANSFERRING FILES BETWEEN DIFFERENT OPERATING SYSTEMS

(71) Applicant: The Boeing Company, Chicago, IL (US)

(72) Inventors: Omid B. Nakhjavani, Mill Creek, WA (US); Micah D. Druckman, Seattle, WA (US)

(73) Assignee: The Boeing Company, Chicago, IL (US)

( * ) Notice: Subject to any disclaimer, the term of this patent is extended or adjusted under 35 U.S.C. 154(b) by 311 days.

(21) Appl. No.: 14/266,462

(22) Filed: Apr. 30, 2014

(65) Prior Publication Data

US 2015/0319216 A1 Nov. 5, 2015

(51) Int. Cl.
*H04L 29/08* (2006.01)
*G06F 17/30* (2006.01)
*H04L 29/06* (2006.01)

(52) U.S. Cl.
CPC ... *G06F 17/30129* (2013.01); *G06F 17/30076* (2013.01); *G06F 17/30115* (2013.01); *H04L 67/06* (2013.01); *H04L 67/10* (2013.01); *H04L 69/08* (2013.01)

(58) Field of Classification Search
CPC ..... H04L 67/06; H04L 67/10; G06F 17/30076
See application file for complete search history.

(56) References Cited

U.S. PATENT DOCUMENTS

| | | | |
|---|---|---|---|
| 7,685,313 B1* | 3/2010 | Kanevsky | H04L 69/08 709/206 |
| 2009/0171972 A1* | 7/2009 | McGeehan | G06F 17/30115 |

* cited by examiner

*Primary Examiner* — Kim T Nguyen
(74) *Attorney, Agent, or Firm* — Kunzler Law Group, PC

(57) ABSTRACT

Disclosed herein is a method for transferring files between different operating systems that includes sending one or more files from a first computing device executing a first operating system to a second computing device executing a second operating system. The first operating system is incompatible with the second operating system. The method also includes processing data of the one or more files using one or more applications executing within the second operating system on the second computing device. Further, the method includes receiving results of the data processing on the first computing device executing the first operating system.

18 Claims, 6 Drawing Sheets

TRANSFERRING FILES BETWEEN DIFFERENT OPERATING SYSTEMS

FIELD

This disclosure relates to transferring files, and more particularly to transferring files between multiple devices executing different operating systems.

BACKGROUND

Automating data processing tasks can be an effective way to achieve efficient and accurate data analysis results. However, automating data processing tasks can be difficult if multiple computing devices that are used to process the data have incompatible operating systems, applications, and/or the like. In certain situations, it may be necessary for a user to manually transfer files, run analysis programs, format data, and/or the like, which is less efficient and may introduce errors into the data analysis process. Moreover, manually performing the data analysis process may require the user to log into multiple computing devices to perform the data analysis instead of being able to monitor the data analysis process from a single computing device.

SUMMARY

The subject matter of the present application has been developed in response to the present state of the art, and in particular, in response to the problems and needs of transferring files between devices executing different operating systems that have not yet been fully solved by currently available systems. For example, conventional methods for transferring files between devices executing different operating systems may involve a user manually performing many of the tasks associated with transferring files for data analysis. In general, the subject matter of the present application has been developed to provide an apparatus, method, and computer program product for transferring files between different operating systems that overcomes at least some of the above-discussed shortcomings of the prior art.

According to one embodiment, a method includes sending one or more files from a first computing device executing a first operating system to a second computing device executing a second operating system. In some embodiments, the first operating system is incompatible with the second operating system. The method also includes processing data of the one or more files using one or more applications executing within the second operating system on the second computing device. In a further embodiment, the method includes receiving results of the data processing on the first computing device executing the first operating system.

In some implementations, the data of the one or more files includes optimization data and the one or more applications executing within the second operating system comprise data optimization applications. In another implementation, the data of the one or more files includes trade study data and the one or more applications executing within the second operating system comprise trade study analysis applications. In a further implementation, the first operating system comprises a Microsoft® Windows® operating system and the second operating system comprises a UNIX® operating system.

In another embodiment, the method includes sending the one or more files from the second computing device to a third computing device executing a third operating system and further processing the data of the one or more files using one or more applications executing within the third operating system. In one implementation, the first and second computing devices are part of a networked computing cluster, which comprises a plurality of computing devices executing different operating systems. In one embodiment, a plurality of the operating systems are incompatible.

In certain implementations, the method includes determining which of the plurality of computing devices to send the one or more files for processing based on one or more of a type of the data of the one or more files, an operating system executing on the computing device, and one or more applications executing within the operating system of the computing device. In another embodiment, the method further includes resending the one or more files to the second computing device for processing in response to the received results not being within a predetermined threshold. In one embodiment, the data of the one or more files is modified according to the data results before being resent.

In certain implementations, the first computing device includes a management application that is configured to send the one or more files to the second computing device and present the results of the data processing on the first computing device. In another implementation, the one or more files are sent from the first computing device to the second computing device in response to one of user input and a predetermined schedule. In a further embodiment, the method includes formatting the data of the one or more files according to one or more data formatting requirements of the second operating system such that the data is compatible with the one or more applications executing on the second computing device.

According to one embodiment, an apparatus includes a processor and memory. The memory stores machine readable code executable by the processor. The machine readable code includes a data module configured to send one or more files from a first computing device executing a first operating system to a second computing device executing a second operating system. In some implementations, the first operating system is incompatible with the second operating system. The machine readable code, in another embodiment, includes an analysis module configured to process data of the one or more files using one or more applications executing within the second operating system on the second computing device. In a further embodiment, the machine readable code includes a results module configured to receive results of the data processing on the first computing device executing the first operating system.

In one embodiment, the data of the one or more files includes optimization data and the one or more applications executing within the second operating system comprise data optimization applications. In a further embodiment, the data of the one or more files includes trade study data and the one or more applications executing within the second operating system comprise trade study analysis applications. In yet another embodiment, the first operating system comprises a Microsoft® Windows® operating system and the second operating system comprises a UNIX® operating system.

In a further implementation, the first and second computing devices are part of a networked computing cluster, the networked computing cluster comprising a plurality of computing devices executing different operating systems. In some embodiments, a plurality of the operating systems are incompatible. In another implementation, the machine readable code includes a selection module configured to determine which of the plurality of computing devices to send the one or more files for processing. In one embodiment, the selected computing device is determined based on one or more of a type of the data of the one or more files, an operating system executing on the computing device, and one or more applications executing within the operating system of the computing device.

In certain embodiments, the machine readable code includes an optimization module configured to resend the one or more files to the second computing device for processing in response to the received results not being within a predetermined threshold. In some embodiments, the data of the one or more files is modified according to the data results before being resent. In yet another embodiment, the machine readable code includes a format module configured to format the data of the one or more files according to one or more data formatting requirements of the second operating system such that the data is compatible with the one or more applications executing on the second computing device.

According to yet another embodiment, a program product includes a computer readable storage medium that stores code executable by a processor to perform operations. The operations, in some implementations, include sending one or more files from a first computing device executing a first operating system to a second computing device executing a second operating system. In some embodiments, the first operating system is incompatible with the second operating system.

In one implementation, the operations include processing data of the one or more files using one or more applications executing within the second operating system on the second computing device. In certain embodiments, the operations include receiving results of the data processing on the first computing device executing the first operating system.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
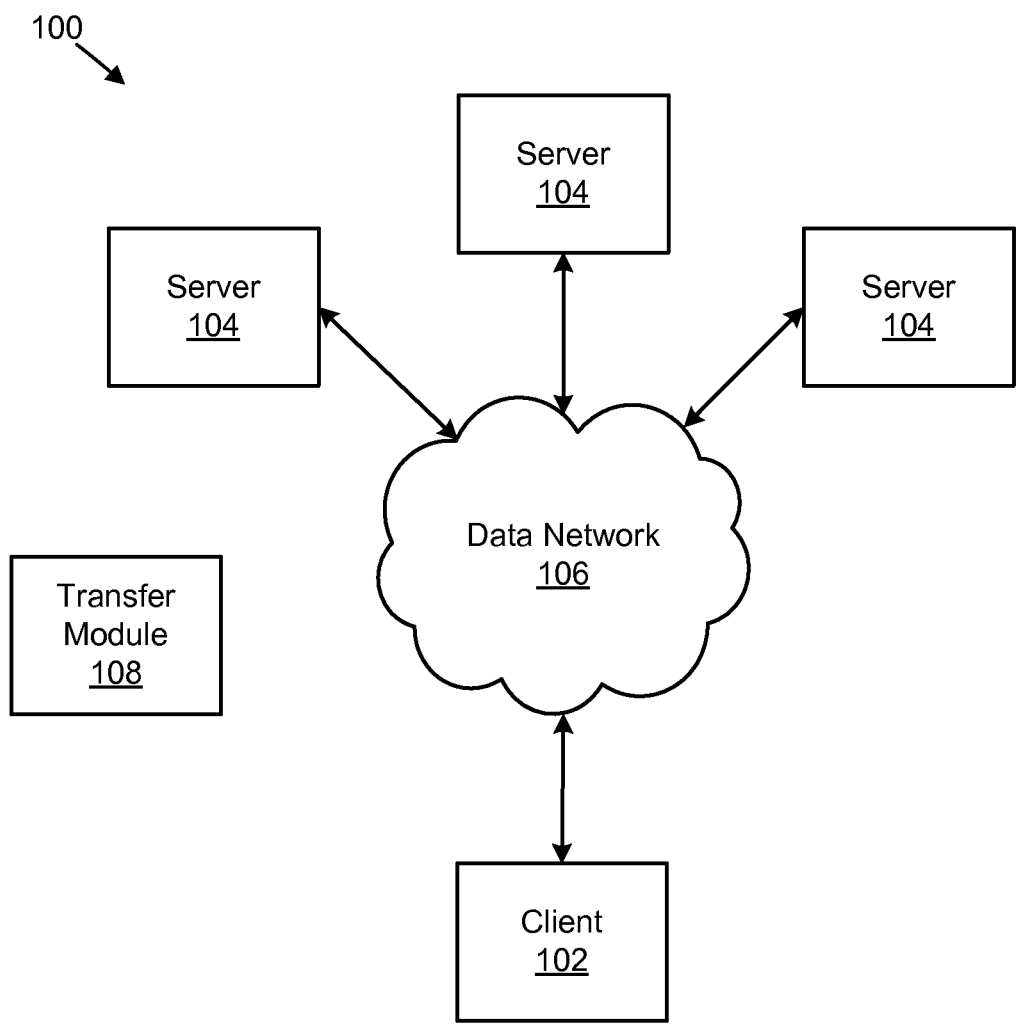
FIG. 1 is a schematic block diagram illustrating one embodiment of a system for transferring files between different operating systems.

FIG. 1 illustrates one embodiment of a system 100 for transferring files between different operating systems. The system 100, in certain embodiments, includes client devices 102, servers 104, data networks 106, and transfer modules 108, which are described in more detail below.

The client devices 102, in one embodiment, include information handling devices, such as desktop computers, laptop computers, tablet computers, smart phones, and/or the like. In some embodiments, the client devices 102 include operating systems such as various versions of mobile and desktop operating systems provided by Microsoft®, Apple®, Linux®, Android®, and/or the like. For example, the client devices 102 may include a desktop computer executing a version of Apple® OSX, Microsoft® Windows®, UNIX®, Linux, or the like. In certain embodiments, the client devices 102 are communicatively coupled to one another through the data network 106.

In one embodiment, the system 100 includes servers 104. The servers 104, in some embodiments, include main frame computers, desktop computers, laptop computers, cloud servers, smart phones, tablet computers, and/or the like. The servers 104 may include computer readable storage media, such as hard disk drives, optical drives, non-volatile memory, random access memory ("RAM"), or the like. In some embodiments, the servers 104 are configured to store data in one or more data storage areas associated with the computer readable storage media, such as data repositories, databases, data partitions, and/or the like. In certain embodiments, the servers 104 comprise one or more virtual servers. In one embodiment, the client devices 102 are communicatively coupled to the servers 104 through the data network 106. In another embodiment, the client devices 102 access data stored on the servers 104 through the data network 106. In some embodiments, the servers 104 are communicatively coupled to other servers 104 through the data network 106. The servers 104, in one embodiment, comprise a high-performance, high-availability computing cluster.

The servers 104, in some embodiments, include operating systems, such as Apple® OSX, Microsoft® Windows®, UNIX® or Linux distributions, or the like. In one embodiment, each server 104 executes the same operating system such that the servers 104 are compatible with each other. In another embodiment, each server 104 executes a different operating system such that the servers 104 are incompatible with each other. In a further embodiment, the servers 104 execute an operating system that is different than the operating system of the client device 102. As used herein, two devices (e.g., a client device 102 and a server 104) are compatible if they can share files, data, program information, or the like without having to modify, alter, create, delete, or change the files, data, program information, or the like, to place the data in a state that can be used by both devices. Thus, files, data, program information, or the like, on a Windows® client device may not be compatible with a server 104 running a version of UNIX® unless the files, data, program information, or the like, is modified to be compatible with the UNIX® server. In some embodiments, the servers 104 are configured to execute one or more programs within their operating systems, such as optimization programs, data analysis programs, statistical packages, mathematical packages, and/or the like. The programs, including the data inputs and outputs, may not be compatible with programs executing within different operating systems on different devices, e.g., the client devices 102 or the servers 104.

The system 100, in one embodiment, includes a data network 106. The data network 106, in certain embodiments, is a digital communication data network that transmits digital communications between the client devices 102 and/or the servers 104. The data network 106 may include a wireless network, such as a wireless telephone network, a local wireless network, such as a Wi-Fi network, a Bluetooth® network, and the like. The data network 106 may include a wide area network ("WAN"), a storage area network ("SAN"), a local area network ("LAN"), an optical fiber network, the internet, or other network known in the art. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory ("RAM"), or the like.

The system 100 includes a transfer module 108. The transfer module 108, in one embodiment, sends one or more files from a first computing device (e.g., the client device 102) to a second computing device (e.g., the server 104). The first computing device may execute an operating system that is different than the operating system executing on the second computing device such that the first and second operating systems are incompatible. The transfer module 108 further processes data of the one or more files using one or more data optimization applications executing within the operating system of the second computing device. In another embodiment, the transfer module 108 receives results of the data processing on the first computing device. In certain embodiments, the transfer module 108 includes a plurality of modules that perform the operations of the transfer module 108. The transfer module 108, with its accompanying modules, is described in more detail with reference to FIGS. 2 and 3.

Figure 2:
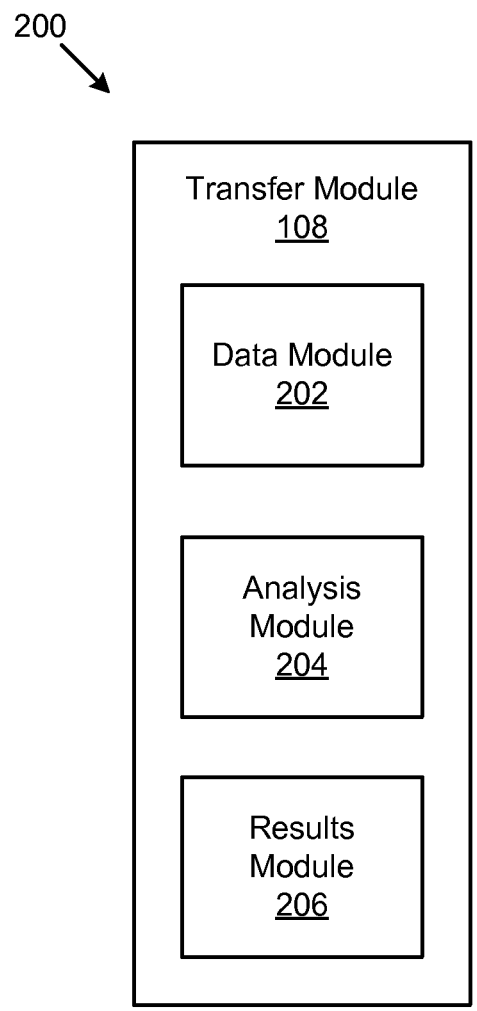
FIG. 2 is a schematic block diagram illustrating one embodiment of a module for transferring files between different operating systems.

FIG. 2 illustrates one embodiment of a module 200 for transferring files between different operating systems. In one embodiment, the module 200 includes an implementation of a transfer module 108. In certain embodiments, the transfer module 108 includes a data module 202, an analysis module 204, and a results module 206, which are described in more detail below.

In one embodiment, the data module 202 is configured to send one or more files from a first computing device, such as the client device 102, to a second computing device, such as the server 104. The data module 202, in certain embodiments, sends the one or more files to the server 104 though the data network 106, using a file transfer protocol ("FTP"), SSH file transfer protocol ("SFTP"), or the like. The client device 102, in some embodiments, executes an operating system that is different than, and incompatible with, the operating system executing on the server 104. For example, the client device 102 may execute a version of Microsoft® Windows® and the server 104 may execute a version of UNIX®.

In one embodiment, the files comprise data to be processed at a server 104. The files may include scripts, executables, and/or data such as raw data, statistical data, analysis data, optimization data, trade study data, and/or the like. In one embodiment, the files are compatible with one or more programs executing on the client device 102, but not with one or more programs executing on the server 104 because the client device 102 and the server 104 execute different and incompatible operating systems. Thus, the files, and the data within the files, may be converted, formatted, modified, or the like, to make the files, and the data, compatible with the one or more programs running on the server 104.

In certain embodiments, the data module 202 sends the one or more files according to a script, a program, or the like. Thus, the data module 202 may send the data files automatically without any further user interaction or input. In one embodiment, the data module 202 sends the files to a server 104 based on automatically recognizing completion of pre-processing tasks that prepare the files before sending them. In some embodiments, the data module 202 sends the files to a server 104 according to a predetermined schedule, which may be based on clock time. For example, the data module 202 may send the files to a server 104 to be processed every night at midnight. In certain embodiments, the data module 202 determines the optimal schedule to send the files to the server 104 based on factors such as network traffic, a capacity of the server 104, a bandwidth of the server 104, or the like. In another embodiment, the data module 202 sends the files to the server 104 in response to user input. For example, a user may choose to send the files immediately, at a future time, or the like. The user may also set up a schedule to have files sent to the server 104 according to the schedule.

The data module 202, in one embodiment, receives the data files at the server 104, or another computing device, and stores the files at an appropriate location on the server 104. For example, if the files comprise data to be optimized on the server 104 using an optimization program running on the server 104, the data module 202 stores the files in a location on the server 104 that is accessible to the optimization program. In some embodiments, the data module 202 archives or packages the files before they are sent to the server 104 using various types of archives, such as .zip, .rar, 0.7z, .tar, and/or the like. The data module 202, in another embodiment, unpacks the files from the archive on the server 104 when the server 104 receives the archived file.

The analysis module 204, in one embodiment, processes the data of the one or more files sent to the server 104 using one or more applications executing within the operating system running on the server 104. In some embodiments, the applications comprise data optimization applications and/or data analysis applications such as finite element analysis applications, stress and fatigue analysis applications, statistical analysis packages, trade study applications, and/or the like. As discussed above, the data of the one or more files may comprise raw data, data formatted for a specific application, scripts, executables, or the like. For example, the data may be formatted for a particular analysis and/or optimization program.

In one embodiment, the analysis module 204 executes the one or more applications in response to receiving the files on the server 104. In certain embodiments, the analysis module 204 determines, based on the type or characteristics of the data, which applications to execute to process the data. In another embodiment, the analysis module 204 executes a particular application to process the data according to a script, message, metadata, and/or the like. For example, a script executed on the client device 102 may specify which program to use on the server 104 to process the data. In another embodiment, the analysis module 204 executes a particular application in response to user input. For example, a user, from the client device 102, may specify or select which program, or set of programs, running on the server 104 to use to process the data.

In some embodiments, the analysis module 204 monitors the progress of the data processing and sends a message, notification, or the like, to the user regarding the status of the data processing. For example, the analysis module 204 may send a notification if an error occurred during the data processing, including details of what error occurred. Alternatively, the analysis module 204 may send a message confirming the successful processing of the data. In some embodiments, the results module 206 sends the notification or message along with the data processing results, if any.

In one embodiment, the results module 206 is configured to receive the results of the data processing from the server 104 at the client device 102. The results module 206, in some embodiments, presents the results to the user at the client device 102. For example, the results module 206 may format and display the results of the data processing on an electronic display of the client device 102. In some embodiments, the results module 206 also presents any notifications, messages, error codes, processing speed/time, or the like, sent by the analysis module 204 regarding the status of the data processing.

The results module 206, in another embodiment, presents a dashboard interface on the client device 102 that graphically presents the data results. The dashboard interface may also include information about the processing of the data on the server 104. For example, the results module 206 may include, in addition to the data results, the processing time or speed, a log of the data processing, the applications that were used to process the data, the capacity of the server 104 at the time the data was processed, and/or the like. In this manner, a user can get a quick and visual overview of the data analysis process to make more informed data analysis decisions in the future, such as when to schedule the data analysis, which applications to use for data analysis, or the like.

In certain embodiments, one or more scripts are executed to perform the operations of the data module 202, the analysis module 204, and the results module 206. As used herein, a script is a program written to automate the execution of tasks on a computing device, such as the client device 102 or the server 104. Different examples of scripts may include Perl® scripts, MATLAB® scripts, batch scripts, shell scripts, JavaScript® scripts, and/or the like. In certain embodiments, a user runs a script on a client device 102, which automates the process of sending one or more files to a server 104 for processing and receiving the processing results from the server 104. In certain embodiments, because the client device 102 and the server 104 execute incompatible operating systems, the script prepares the sent files for processing on the server 104. Additionally, the script receives the results of the data processing and presents the processing results to the user on the client device 102. In certain embodiments, a script may run an analysis on a batch of different data files.

Traditionally, because the client device 102 and the server 104 execute incompatible operating systems, each step of the process was performed manually by a user. For example, a user may have had to manually send files from a Windows® desktop computer or client device to a UNIX® server for processing and analysis. The user may have had to manually format the data, place the files in a location on the server 104 accessible to one or more data analysis programs, manually start the programs, and/or the like. Additionally, after the UNIX® server processed the data, the user may have had to manually send the data results back to the Windows® computer, including formatting the results, presenting the results, and/or the like.

Advantageously, by automating this process, a user is able to send data from a client device 102 executing a first operating system to a server 104, or other computing device, executing a second operating system that is incompatible with the first operating system, without requiring any further action by the user. Moreover, a user may sit behind a "single pane of glass," such as a single management application, or the like, on the client device 102, which allows the user to start the data analysis process and view the results of the data processing without switching to different server consoles, or the like, to manage data transfers, processing, formatting, and/or the like.

In one embodiment, the client device 102 and the servers 104 are part of a networked computing cluster environment. The networked computing cluster, in certain embodiments, includes a plurality of computing devices, such as servers 104, executing various operating systems. For example, the networked computing cluster may include servers 104 running various, incompatible, operating systems, such as UNIX®, Microsoft® Windows®, Apple® OSX, Linux®, Android®, and/or the like.

Figure 4:
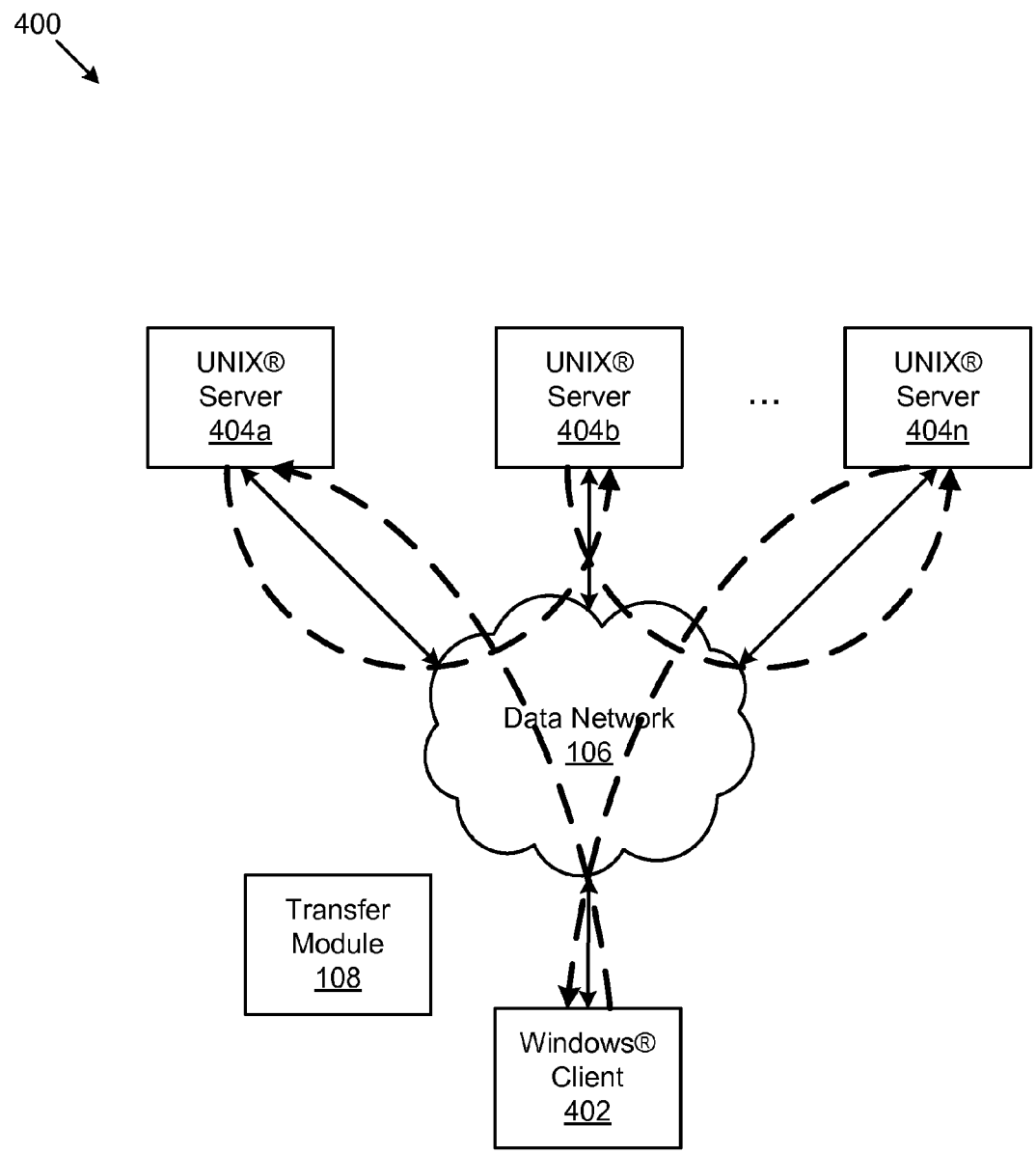
FIG. 4 is a schematic block diagram illustrating one embodiment of a system for transferring files between different operating systems.

In certain embodiments, the data module 202 sends files from a client device 102 to a plurality of servers 104. In certain embodiments, at least a portion of the plurality of servers 104 execute operating systems that are incompatible with the operating system executing on the client device 102. In one example, the data module 202 may send the data files to a server 104 from the client device 102 to be processed by an optimization application. In order to perform further processing on the data, the data module 202 may then send the data files to another server 104 to be processed by a different optimization application, and so on. The data module 202, in some embodiments, sends the data files from a server 104 to another server 104 without sending the data files back to the client device 102 until the data files have been entirely processed, as is depicted in FIG. 4. In some embodiments, the analysis module 204 organizes the order of processing to determine which servers to send the data for additional processing. The results module 206 may collect and arrange results of the data processing, which may include different sets of results based on the type of processing performed, and send the results to the client device 102.

Figure 3:
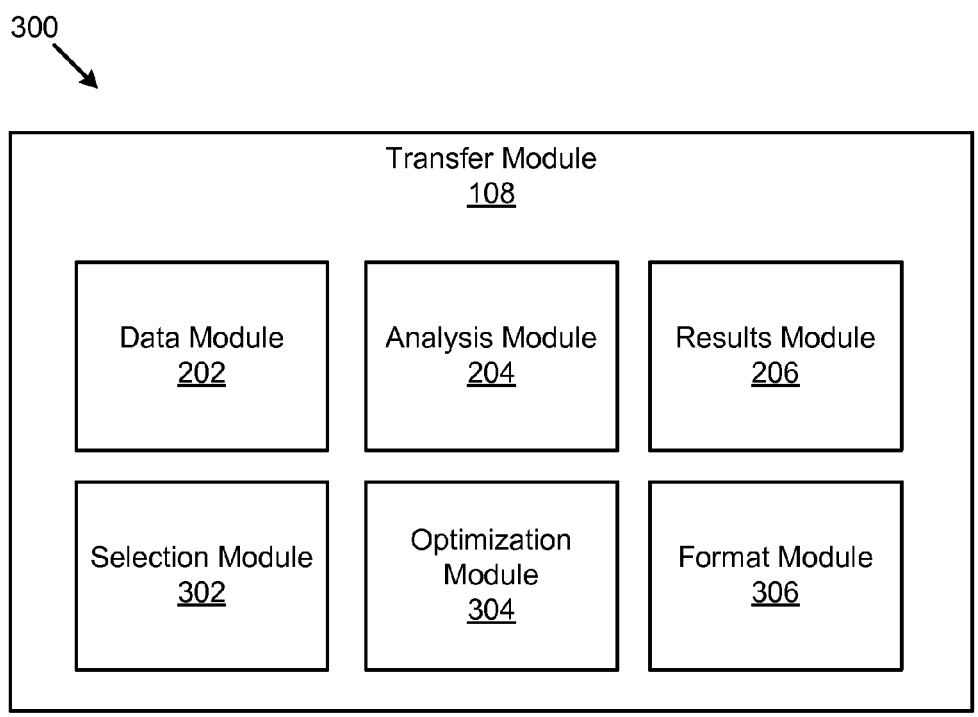
FIG. 3 is a schematic block diagram illustrating one embodiment of another module for transferring files between different operating systems.

FIG. 3 depicts another embodiment of a module 300 for transferring files between different operating systems. In some embodiments, the module 300 includes an implementation of a transfer module 108. The transfer module 108 includes a data module 202, an analysis module 204, and a results module 206, which may be substantially similar to the data module 202, the analysis module 204, and the results module 206 described above with reference to the module 200 of FIG. 2. The transfer module 108 of the module 300, in one embodiment, also includes a selection module 302, an optimization module 304, and a format module 306, which are described in more detail below.

The selection module 302, in one embodiment, determines which of the plurality of computing devices (e.g., which server 104) to send the one or more files for processing. In certain embodiments, the selection module 302 determines which server 104 to send the one or more files based on the type of the data in the files, the operating system executing on the servers 104, the applications running in the operating systems on the servers 104, and/or the like. For example, a server 104 may execute an application that processes binary data better than another server 104. Thus, if the files contain binary data, the selection module 302 may choose the server 104 that is optimized to process binary data.

In another embodiment, the selection module 302 determines which server 104 to send files based on the capacity of the server 104, the security characteristics of the server 104, the connection bandwidth of the data network 106 connection between a client device 102, or a different server, and the "target" server, and/or the like. For example, if a server 104 does not have the capacity to process the data or, if the data contains sensitive data and the server 104 is not within a secure computing environment, the selection module 302 may not select the server 104. Additionally, if the data network 106 connection between the client device 102 and the server 104 is not reliable or if the speed of the connection is below a predetermined threshold, the selection module 302 may not select the server 104.

In another embodiment, the data module 202 sends the files to a plurality of servers 104 to distribute processing of the data. In such an embodiment, the selection module 302 determines a plurality of servers 104 to send the files for data processing. The selection module 302 may select the plurality of servers 104 based on the factors discussed above, in addition to other distributed computing factors, such as information sharing, data processing coordination, communication of the server 104, the complexity of the data processing, and/or the like. In this manner, the selection module 302 may leverage computing efficiencies (e.g., if one server 104 can process the data faster than another server 104) to obtain faster data analysis results.

The optimization module 304, in some embodiments, is configured to resend the one or more files from the client device 102 to the server 104 for processing in response to the received data results not being within a predetermined threshold. In one embodiment, the optimization module 304 determines whether the data results are within a predetermined threshold value, which may be defined as a standard deviation, a statistical significance, a percentage, a user-defined optimal value, and/or the like. For example, in one embodiment, the threshold value for a particular optimization value may be two standard deviations, and the optimization module 304 may determine whether the optimization value for a set of data results is within the predetermined threshold. If not, the optimization module 304 resends the one or more files to the server 104 to be reanalyzed.

In one embodiment, the optimization module 304 modifies the data of the one or more files according to the data results before the files are resent. Thus, instead of resending the same data to be reanalyzed, the optimization module 304 modifies the data of the one or more files according to the data results and sends the one or more files to a server 104 to be further processed and refined. In certain embodiments, the optimization module 304 transforms the data by deleting data points, adding data points, mathematically modifying data points, substituting data points, and/or the like. The optimization module 304, in some embodiments, determines how to modify the data based on one or more of the received data results. For example, if the data results are close to predetermined threshold, the optimization module 304 may mathematically transform the data, without changing the meaning of the data, to try to optimize the data such that the results fall within the predetermined threshold.

In another embodiment, the optimization module 304 selects a different optimization process to process the data. In yet another embodiment, the optimization module 304 specifies different analysis settings, such as parameters, settings, configuration files, and/or the like that the analysis module 204 uses to process the data. The analysis settings may determine how an analysis application processes data on a server 104. The analysis settings, in one embodiment, may be associated with an operating system. For example, a UNIX® optimization application may have different settings than a Linux® optimization application. Thus, the optimization module 304 may determine which processing settings are optimal to achieve data results within the predetermined threshold based on a previous data results set and the operating system.

In one embodiment, the format module 306 is configured to format the data of the one or more files according to one or more data formatting requirements of the server 104 such that the data is compatible with the one or more applications executing on the server 104. For example, a Windows® server may comprise a trade study application that requires the data to be in a comma-separated values format. If the files being sent to the server 104 by the data module 202 include data that is in a different format, such as a tab-separated values format, the format module 306 may format the data such that it complies with the requirements of the trade study application.

In another embodiment, the format module 306 formats the data results before the results module 206 presents the results on the client device 102. In some embodiments, the format module 306 formats the data results according to the operating system of the client device 102. For example, a data presentation application (e.g., such as a single management application, a dashboard, or the like) on a Windows® client device may require the data results to be provided in a different format than a data presentation application on a UNIX® client device.

In an example embodiment describing the interactions between modules 202-206 and 302-306, a script may perform the operations of the modules 202-206 and 302-306 and may comprise an integrated process within a single application. In such an embodiment, the script, and in particular modules 202-206 and 302-306, has access to predefined working directories/folders on the client device 102 and/or the server 104. The script, in one embodiment, prompts a user for input file names, run parameters, and/or the like, and also for the names of the analysis and/or optimization programs that utilize the provided file names and/or run parameters. In one embodiment, the analysis module 204 receives the user input and passes the input file names and/or run parameters to the specified analysis and/or optimization programs.

The analysis module 204, in certain embodiments, uses a predefined wrapper to call a script file that copies the provided input file names and maps the input file names to predefined fixed file names. In this manner, the optimization module 304 may send the data to be processed again without re-prompting the user for the input file names and/or run parameters. The analysis module 204, or the format module 306, in some embodiments, prepares data to be sent to the server 104 by calling a script file that runs any preliminary scripts, analysis programs, optimization programs, and/or the like using the specified input file names and/or run parameters. The data module 202 then sends the files comprising the output data generated by the programs called by the analysis module 204 to a server 104 for further analysis.

The data module 202, in certain embodiments, separates the generated output files into a plurality of blocks or modules. The data module 202 sends each block or module to the analysis module 204 to be analyzed, either locally on the client device 102 or remotely on the server 104. If the data module 202 sends data to the server 104, the data module 202 may use a file transfer protocol, such as FTP, SFTP, and/or the like. In certain embodiments, output data generated based on an analysis of each block of data may be input data for the next block of data. For example, output data generated by an analysis of block A may be input data for the analysis of block B. After the analysis module 204 has processed the received data (e.g., after the analysis and/or optimization programs called by the analysis module 204 have analyzed the data), the results module 206 prepares and sends the data results (as one or more results files) to the client device 102. Beneficially, this allows data to be analyzed using programs running on the server 104 that are specialized for the second operating system and which may not be available on the client device 102 because the programs are not compatible with the first operating system. Additionally, the programs executing within the second operating system on the server 104 may exhibit faster performance than if they were to be executed on the client device 102.

The optimization module 304, in some embodiments, determines whether the data contained in the results files is within a predetermined threshold. If not, then the optimization module 304 may notify the data module 202 to resend the data to be reanalyzed by the analysis module 204. The optimization module 304, in certain embodiments, modifies the data, such as changing thickness properties in a finite element model, before the data is resent to the server 104 to try to meet the predetermined threshold. As described above, a user may begin the analysis process from the client device 102, and also view the analysis results from the same client device. In this manner, the user may sit behind a "single pane of glass" i.e., the client device 102, without having to manually interact with (e.g., transfer files, start programs, or the like) various incompatible devices or servers 104.

FIG. 4 depicts one embodiment of a system 400 for transferring files between different operating systems. In particular, FIG. 4 illustrates the path that the one or more files may take through a networked computing cluster in order for the data of the one or more files to be analyzed. In one embodiment, the system 400 includes a Windows® client device 402, a plurality of UNIX® servers 404a-n, a data network 106, and a transfer module 108, which may be substantially similar to the client devices 102, servers 104, data networks 106, and transfer modules 108 of FIG. 1.

In one embodiment, the Windows® client device 402 executing an instance of the Windows® operating system sends one or more data files to a first UNIX® server 404a via the data network 106. In one embodiment, the data module 202 sends the one or more data files to the first UNIX® server 404a. In an example embodiment, the one or more data files may comprise data associated with fatigue analysis, which, as used herein, is the process of determining if a material will crack due to repeatedly applied loads. The first UNIX® server 404a may include one or more applications that perform fatigue analysis and/or optimization, or at least a portion of the data processing for fatigue analysis and/or optimization.

The analysis module 204, in one embodiment, processes the data of the one or more data files on the first UNIX® server 404a. The first UNIX® server 404a, however, may not include the applications needed to complete the fatigue analysis. The data module 202, in such an embodiment, sends the one or more files, together with the results of the processing on the first UNIX® server 404a, to a second UNIX® server 404b for further processing. The analysis module 204 further processes the fatigue analysis data on the second UNIX® server 404b. The analysis module 204, in one embodiment, determines whether further processing is necessary on one or more different servers 404. If so, the data module 202 sends the one or more files and the results of the data processing to a different UNIX® server 404n. This process may continue until the analysis module 204 determines the fatigue analysis is complete.

In one embodiment, the results module 206 receives the results of the fatigue analysis on the Windows® client device 402 and presents the fatigue analysis results to a user. In one embodiment, the optimization module 304 determines whether the fatigue analysis results are within a predetermined threshold, and, if not, resends the one or more files for further processing. In this manner, a user, or a Windows® client device 402, may perform data analysis using multiple applications executing on multiple devices 404a-n that are running incompatible operating systems without requiring the user to manually perform or interfere with the analysis process.

Figure 5:
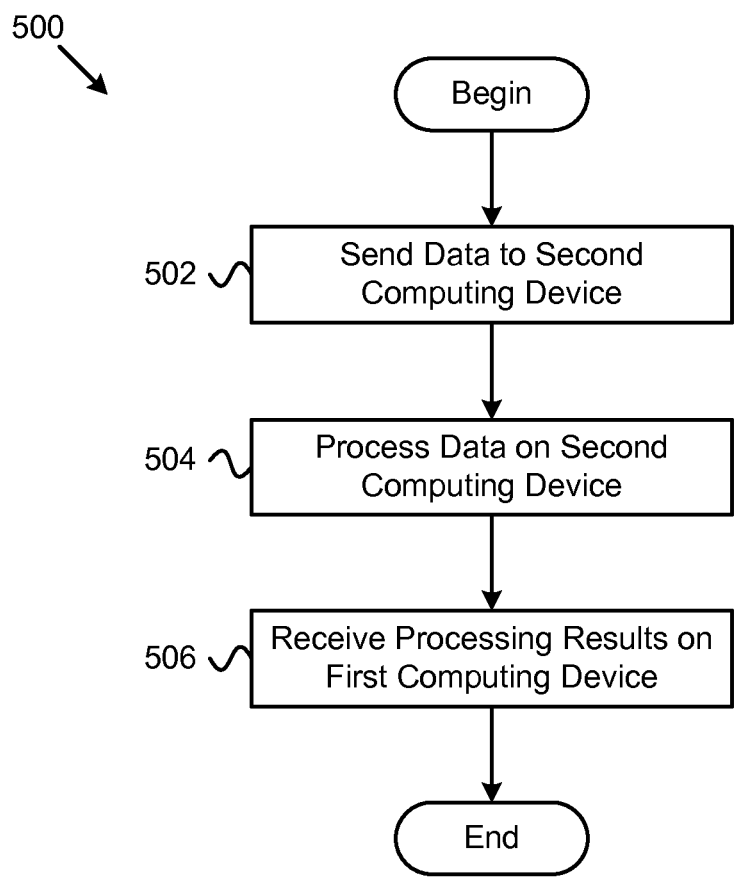
FIG. 5 is a schematic flow diagram illustrating one embodiment of a method for transferring files between different operating systems.

FIG. 5 depicts one embodiment of a method 500 for transferring files between different operating systems. In one embodiment, the method 500 begins and the data module 202 sends 502 one or more data files from a first computing device (e.g., a client device 102) executing a first operating system, to a second computing device (e.g., a server 104) executing a second operating system. In some embodiments, the first operating system is incompatible with the second operating system.

In another embodiment, an analysis module 204 processes 504 data of the one or more files using one or more applications executing within the second operating system on the second computing device. A results module 206, in one embodiment, receives 506 results of the data processing on the first computing device executing the first operating system, and the method 500 ends.

Figure 6:
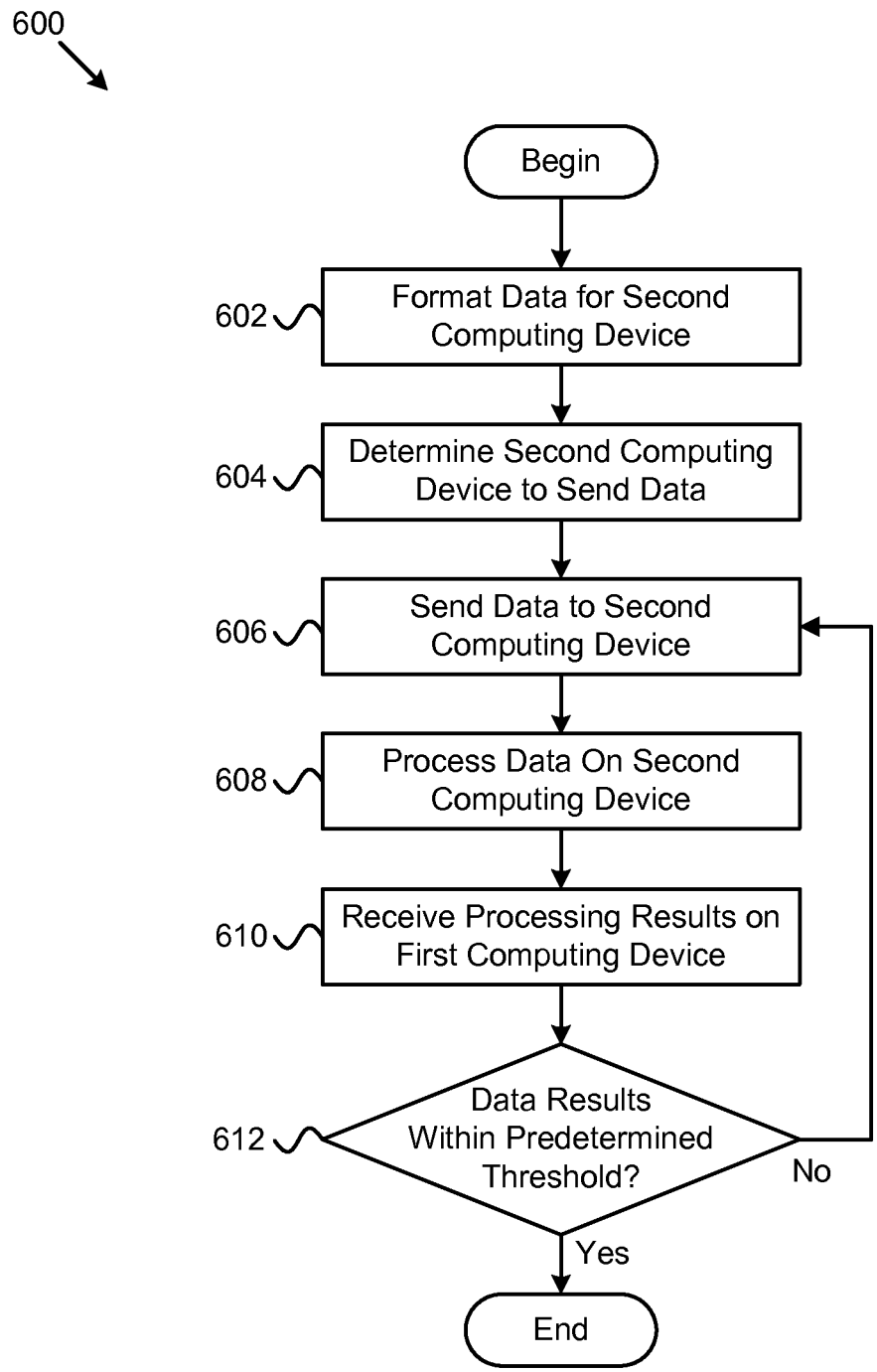
FIG. 6 is a schematic flow diagram illustrating one embodiment of another method for transferring files between different operating systems.

FIG. 6 depicts one embodiment of another method 600 for transferring files between different operating systems. In one embodiment, the method 600 begins and the format module 306 formats 602 data of the one or more files according to one or more data formatting requirements of a second operating system such that the data is compatible with the one or more applications executing on a second computing device (e.g., server 104). In one embodiment, the format module 306 may call scripts, analysis programs, optimization programs, or the like to prepare and format 602 the data. In another embodiment, the selection module 302 determines 604 which computing device of a plurality of computing devices to send the one or more files for processing. In certain embodiments, the selected computing device is determined based on a type of the data of the one or more files, an operating system executing on the second computing device, or one or more applications executing within the operating system of the selected computing device.

In some embodiments, a data module 202 sends 606 the one or more files from a first computing device executing a first operating system to a second computing device executing a second operating system. In some embodiments, the data module 202 breaks the data into predefined blocks or modules and incrementally sends the blocks or modules of data to the second computing device. In such an embodiment, the output data generated by an analysis of one block of data may be input data for an analysis of a subsequent block of data. In another embodiment, an analysis module 204 processes 608 data of the one or more files using one or more applications executing within the second operating system on the second computing device. In a further embodiment, a results module 206 receives 610 results of the data processing on the first computing device executing the first operating system. In certain embodiments, the results module 206 calls scripts, analysis programs, optimization programs, and/or the like, to prepare the results for transfer to the first computing device.

In a further embodiment, an optimization module 304 determines 612 whether the received data results are within a predetermined threshold. If the optimization module 304 determines 612 that the data results are not within a predetermined threshold, the optimization module 304 may resend the one or more data files, or notify the data module 202 to resend the data files, to the second computing device. In such an embodiment, the optimization module 304 may modify the data, such as changing the thickness properties in a finite element model, before the data is resent to the second computing device. Otherwise, the optimization module 304 determines 612 the data results are within a predetermined threshold, and the method 600 ends.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

Aspects of the embodiments may be described above with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method comprising:
sending one or more files from a first computing device executing a first operating system to a second computing device executing a second operating system, the first operating system being incompatible with the second operating system;
processing data of the one or more files using one or more applications executing within the second operating system on the second computing device;
receiving results of the data processing on the first computing device executing the first operating system;
determining whether the results of the data processing satisfy a predetermined threshold;
modifying the data of the one or more files based on the results of the data processing responsive to determining that the results of the data processing do not satisfy the predetermined threshold; and
resending the one or more files with the modified data from the first computing device to the second computing device.

2. The method of claim 1, wherein the data of the one or more files comprises optimization data and the one or more applications executing within the second operating system comprise data optimization applications.

3. The method of claim 1, wherein the data of the one or more files comprises trade study data and the one or more applications executing within the second operating system comprise trade study analysis applications.

4. The method of claim 1, wherein the first operating system comprises a Microsoft® Windows® operating system and the second operating system comprises a UNIX® operating system.

5. The method of claim 1, further comprising sending the one or more files from the second computing device to a third computing device executing a third operating system and further processing the data of the one or more files using one or more applications executing within the third operating system.

6. The method of claim 1, wherein the first and second computing devices are part of a networked computing cluster, the networked computing cluster comprising a plurality of computing devices executing different operating systems, wherein a plurality of the operating systems are incompatible.

7. The method of claim 6, further comprising determining which of the plurality of computing devices to send the one or more files for processing based on one or more of a type of the data of the one or more files, an operating system executing on the computing device, and one or more applications executing within the operating system of the computing device.

8. The method of claim 1, wherein the first computing device comprises a management application that is configured to send the one or more files to the second computing device and present the results of the data processing on the first computing device.

9. The method of claim 1, wherein the one or more files are sent from the first computing device to the second computing device in response to one of user input and a predetermined schedule.

10. The method of claim 1, further comprising formatting the data of the one or more files according to one or more data formatting requirements of the second operating system such that the data is compatible with the one or more applications executing on the second computing device.

11. An apparatus comprising:
a processor;
a memory that stores machine readable code executable by the processor, the machine readable code comprising:
a data module configured to send one or more files from a first computing device executing a first operating system to a second computing device executing a second operating system, the first operating system being incompatible with the second operating system;
an analysis module configured to process data of the one or more files using one or more applications executing within the second operating system on the second computing device;
a results module configured to receive results of the data processing on the first computing device executing the first operating system; and
an optimization module configured to:
determine whether the results of the data processing satisfy a predetermined threshold;
modify the data of the one or more files based on the results of the data processing responsive to determining that the results of the data processing do not satisfy the predetermined threshold; and
resend the one or more files with the modified data from the first computing device to the second computing device.

12. The apparatus of claim 11, wherein the data of the one or more files comprises optimization data and the one or more applications executing within the second operating system comprise data optimization applications.

13. The apparatus of claim 11, wherein the data of the one or more files comprises trade study data and the one or more applications executing within the second operating system comprise trade study analysis applications.

14. The apparatus of claim 11, wherein the first operating system comprises a Microsoft® Windows® operating system and the second operating system comprises a UNIX® operating system.

15. The apparatus of claim 11, wherein the first and second computing devices are part of a networked computing cluster, the networked computing cluster comprising a plurality of computing devices executing different operating systems, wherein a plurality of the operating systems are incompatible.

16. The apparatus of claim 15, further comprising a selection module configured to determine which of the plurality of computing devices to send the one or more files for processing, the selected computing device being determined based on one or more of a type of the data of the one or more files, an operating system executing on the computing device, and one or more applications executing within the operating system of the computing device.

17. The apparatus of claim 11, further comprising a format module configured to format the data of the one or more files according to one or more data formatting requirements of the second operating system such that the data is compatible with the one or more applications executing on the second computing device.

18. A computer program product comprising a non-transitory computer readable storage medium storing computer usable program code executable to perform operations, the operations comprising:
sending one or more files from a first computing device executing a first operating system to a second computing device executing a second operating system, the first operating system incompatible with the second operating system;

processing data of the one or more files using one or more applications executing within the second operating system on the second computing device;

receiving results of the data processing on the first computing device executing the first operating system;

determining whether the results of the data processing satisfy a predetermined threshold;

modifying the data of the one or more files based on the results of the data processing responsive to determining that the results of the data processing do not satisfy the predetermined threshold; and resending the one or more files with the modified data from the first computing device to the second computing device.

* * * * *